United States Patent [19]

Younskevicius

[11] 4,110,049

[45] Aug. 29, 1978

[54] SUN METER

[75] Inventor: Robert E. Younskevicius, Largo, Fla.

[73] Assignee: The United States of America as represented by the United States Department of Energy, Washington, D.C.

[21] Appl. No.: 775,493

[22] Filed: Mar. 8, 1977

[51] Int. Cl.² .......................... G01J 1/42; H01J 39/12
[52] U.S. Cl. .................................... 356/222; 250/208
[58] Field of Search ....................... 356/215, 218–222; 354/51; 250/203 R, 206 R, 336, 578, 208; 346/107 R; 126/270, 271; 307/311

[56] References Cited

U.S. PATENT DOCUMENTS

| | | | |
|---|---|---|---|
| 3,424,907 | 1/1969 | Fishnell | 250/203 R |
| 3,875,404 | 4/1975 | Fletcher et al. | 250/203 R |
| 4,008,391 | 2/1977 | Henderson, Jr. | 356/121 |
| 4,015,116 | 3/1977 | Bahm | 356/215 |

*Primary Examiner*—John K. Corbin
*Assistant Examiner*—Rolf Hille
*Attorney, Agent, or Firm*—Dean E. Carlson; Clifton E. Clouse, Jr.; Albin Medved

[57] ABSTRACT

A simple, inexpensive device for measuring the radiation energy of the sun impinging on the device. The measurement of the energy over an extended period of time is accomplished without moving parts or tracking mechanisms.

5 Claims, 6 Drawing Figures

SUN METER

The invention disclosed herein was made under, or in, the course of U.S. Department of Energy Contract No. E(04-3)-1109 with Honeywell Inc.

BACKGROUND OF THE INVENTION

This invention relates generally to devices for measuring radiation energy and specifically to devices for measuring the radiation from the sun. An example of representative prior art is U.S. Pat. No. 3,891,326 relating to a multi-channel sun photometer. As is typical of prior art, the device of U.S. Pat. No. 3,891,326, must be properly aligned, depending on the momentary position of the sun, to provide accurate readings.

SUMMARY OF THE INVENTION

The sun meter according to the present invention is an inexpensive device providing a reasonably accurate direct measurement of the sun energy incident on the meter, without using moving parts or tracking mechanisms. It includes two wide angle sensors, such as silicon photodetectors, set in a vertical plane and spaced 60° on each side of the vertical normal. For varying input incident angles, the output of each sensor is proportional to the cosine of the angle made by the incident ray with the sensitive axis of the sensor. By summing the outputs of the two sensors, incident rays parallel to the plane of the sensors can be measured, with a scaling variation of less than ± 7 percent, without tracking or moving parts.

The data received from the sensors can be enhanced to provide more accurate measurements by multiplying the readings by the inverse of the meter scale factor which applies at the time of the day the data is taken.

The sun meter according to the present invention has a very wide frequency response which allows for the observation of transient conditions. The meter of this type is useful in gathering data in the study of the transient effects of clouds in general. For example, the meter can provide valuable data as to what transient input variations need be accounted for in the design of a large scale solar energy electric generation plant. The prior art devices on the market have relatively long time constants that tend to average the readings taken.

A further feature of the sun meter according to the present invention is that it is a very stable monitor which can be left operating for long periods of time over wide temperature variations with negligible drift errors. This stability results from the operation of the sensors in the short circuit mode at an effective zero bias. The variable parameters of $\beta$ and the leakage current are thereby reduced to inconsequential levels.

It is therefore an object of the present invention to provide a simple and inexpensive device for providing a reasonably accurate measure of sun's radiation incident on the device throughout the day without using clock driven mounts or tracking mechanisms. A further object of the present invention is to provide a sun meter which has a wide frequency response to allow for observation of transient conditions. A still further object of the invention is to provide a sun meter which will serve as a stable monitor over long periods of time and wide temperature variations. These and further objects of the present invention will become obvious to those skilled in the art after inspection of the following specification, claims, and drawing.

DESCRIPTION OF THE PREFERRED EMBODIMENTS

Figure 1:
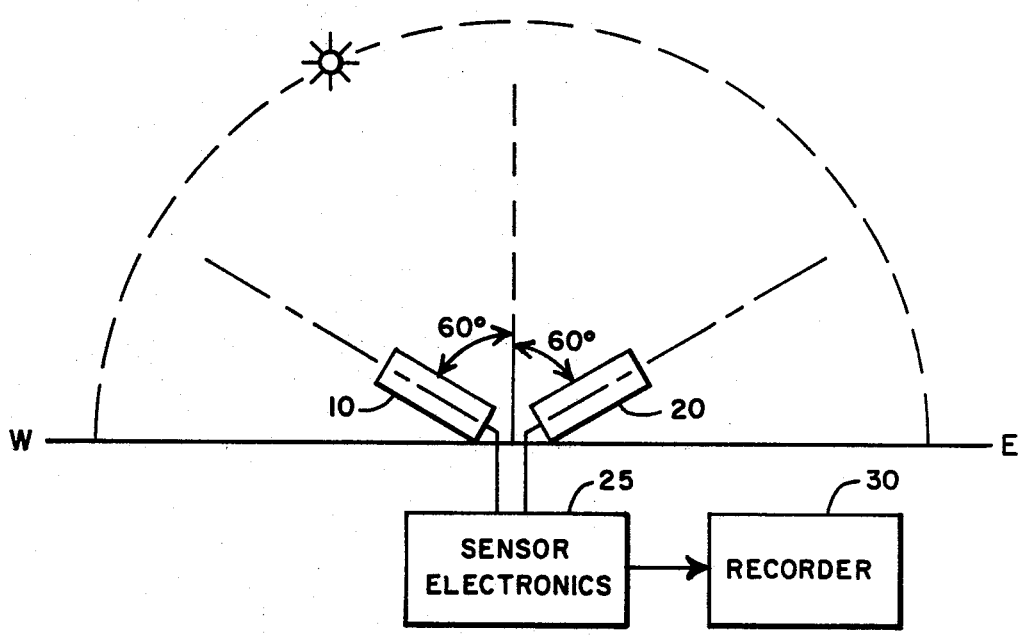
FIG. 1 is a graphic representation of the sensor orientation in the preferred embodiment of the present invention.

FIG. 1 shows a pair of sensors, such as phototransistors or photodiodes, 10 and 20, each oriented along an axis lying in a substantially vertical plane having an east-west orientation. The axis of sensor 10 is displaced 60° from the vertical in the direction towards west and the axis of sensor 20 is displaced 60° from the vertical in the direction towards east. Sensors 10 and 20 generate electrical signals in response to energy received from the sun. The electrical signals generated by sensors 10 and 20 are applied to the inputs of sensor electronics 25, wherein the signals are summed. The signal representing the sum of the sensor signals appears at the output of electronics 25 and is applied to a recorder 30.

Figure 2:
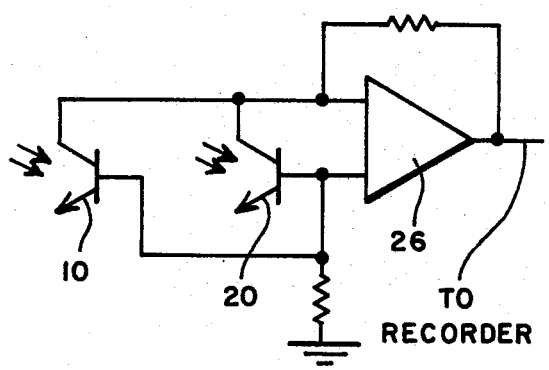
FIG. 2 illustrates a simple circuit for combining the output of the two sensors.

In the simplest form, the sensor electronics 25 of FIG. 1 can take the form shown in FIG. 2. The signals from the outputs of sensors 10 and 20 are applied to a common point at one of the inputs of an amplifier 26. In the experimental model, operated successfully, sensors 10 and 20 comprised silicon phototransistors connected between the collector-base junctions to function as photodiodes. The signal appearing at the output of amplifier 26 can be applied to a recorder or measured in other standard ways well known in the art.

Figure 3:
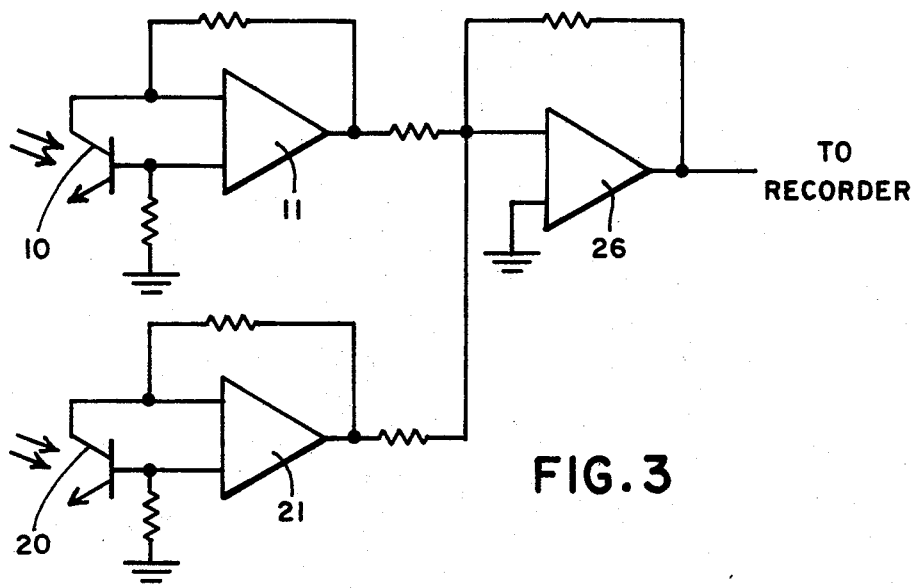
FIG. 3 illustrates a circuit for an alternate embodiment of the present invention.

An alternate embodiment of the sensor electronics is shown in FIG. 3 wherein separate amplifiers are used to process the signal from each sensor. Using the separate amplifiers allows separate scale factor adjustments for variations in sensor parameters. The signal from sensor 10 is applied to the input of an amplifier 11 while the signal from sensor 20 is applied to the input of an amplifier 21. The outputs of amplifiers 11 and 21 are summed by application to the same input of amplifier 26. The output of amplifier 26 can be applied to a recorder or to another type of indicator.

Figure 4:
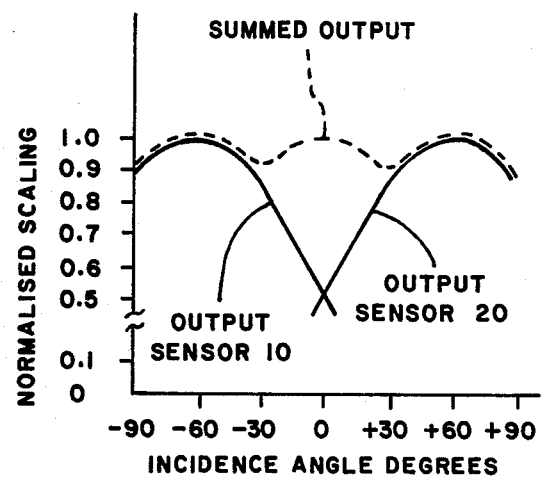
FIG. 4 is a graphical representation of the summed outputs of the two sensors.

FIG. 4 illustrates graphically the signal generated by each of the two sensors shown in FIG. 1, and a signal which is a summed combination of the two sensor signals. The two sensor signals are proportional to the cosine of the angle between the sensitive axis of the sensor and incident rays of the sun. The combined signal provides a reasonably accurate measure of the energy received from the sun at the location of the meter, regardless of the position of the sun in the sky. As can be seen, this is accomplished without using moving parts or tracking mechanisms. Further accuracy can be obtained by multiplying the output of the sun meter with a scale factor which applies at the time of the day the data is taken.

Figure 5:
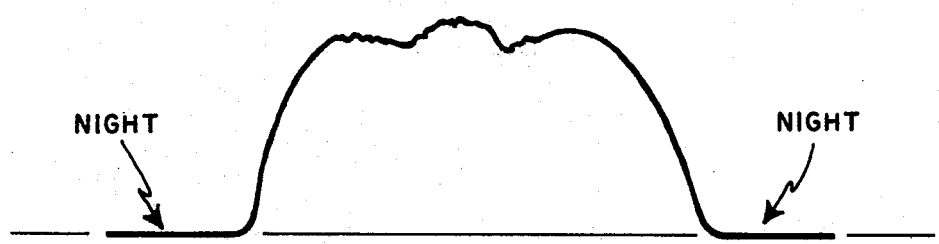
FIG. 5 is a graphical representation of actual data obtained on a clear day from the sun meter according to the present invention.
Figure 6:
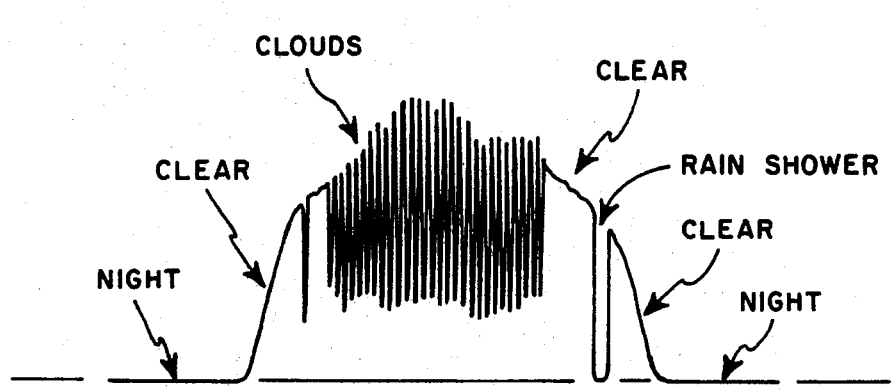
FIG. 6 is a graphical representation of data obtained on a partly cloudy day.

The actual data taken with a meter of the type described herein is illustrated in the graphs of FIGS. 5 and 6. FIG. 5 is a duplication of a pen recording of the sun meter output on a clear day. The low level signal amplitudes at the right and the left ends of the curve represent the dark hours before the sunrise and after the sunset, respectively. The middle part of the curve, it will be noted, is very similar to the shape of the combined signal in the graph of FIG. 4.

The representation in the graph of FIG. 6 is similar to that of FIG. 5, except that on the day the recording was made, the sky was partly cloudy, from time to time obstructing the sun. The frequent vertical excursions of the pen at the middle part of the graph were caused by the presence of clouds. The rather extended interruption in the signal during the daylight hours, towards the right side of the graph, was caused by a rain shower.

As the graph of FIG. 6 illustrates, the sun meter according to the present invention has a very wide frequency response which allows observation of transient conditions. The usefulness of the device for the gathering of data in the study of the transient effects of clouds has been demonstrated.

The representation of actual pen recordings of the output of the sun meter shown in FIGS. 5 and 6, one taken on a clear day and the other taken on a day which had a variety of conditions, have the record of 2 full day's time compressed into a length of only a few inches. By simply speeding up the recording, the rate of change of energy at the leading and the trailing edges of an intersecting cloud can be shown with much more resolution.

Although this invention has been described with reference to particular embodiments, it will be understood to those skilled in the art that this invention is also capable of a variety of alternative embodiments within the spirit and the scope of the appended claims.

I claim:

1. Apparatus for measuring energy received from the sun at a particular location, said apparatus comprising:
   a first radiant energy sensor, sensitive along a first axis, for producing a first electrical signal responsive to radiant energy impinging on said first sensor;
   a second radiant energy sensor, sensitive along a second axis displaced 120° from said first axis, for producing a second electrical signal responsive to radiant energy impinging on said second sensor; and
   summing means for receiving said first and second electrical signals and for providing an output signal which is the sum of the two.

2. Apparatus according to claim 1, wherein said first and second radiant energy sensors are phototransistors.

3. Apparatus according to claim 1, wherein said first and second radiant energy sensors are photodiodes.

4. Apparatus according to claim 1, wherein a recorder is provided for receiving and recording the signal from said summing means.

5. Apparatus according to claim 1, wherein said first and second axes associated with said first and second radiant energy sensors, respectively, lie substantially in the plane of the earth's orbit around the sun and said first axis is displaced 60° from the normal vertical in the direction towards west while said second axis is displaced 60° from the normal vertical in the direction towards east.

* * * * *